June 4, 1940.   W. A. GIBBS   2,203,566
METHOD FOR REMOVING BONES FROM FISH
Filed Aug. 11, 1938
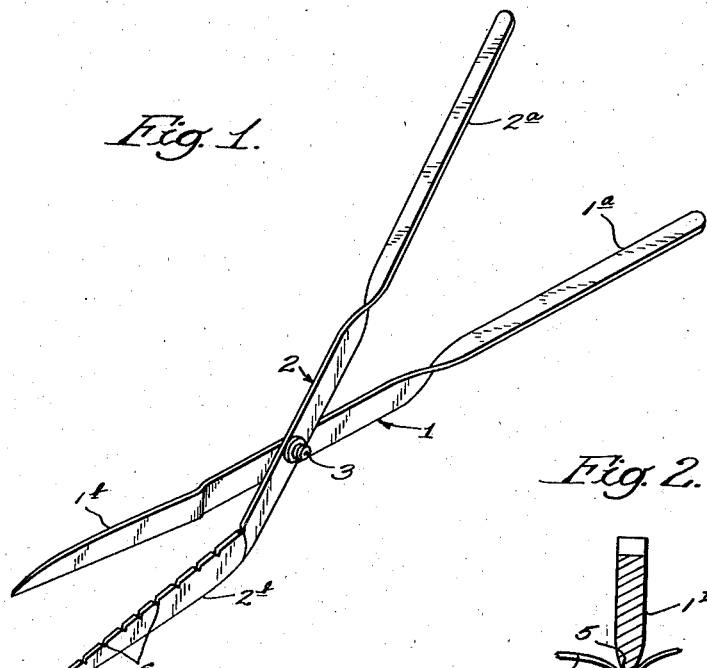
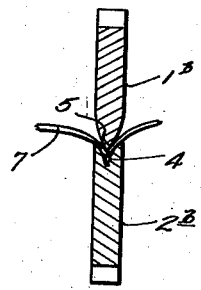
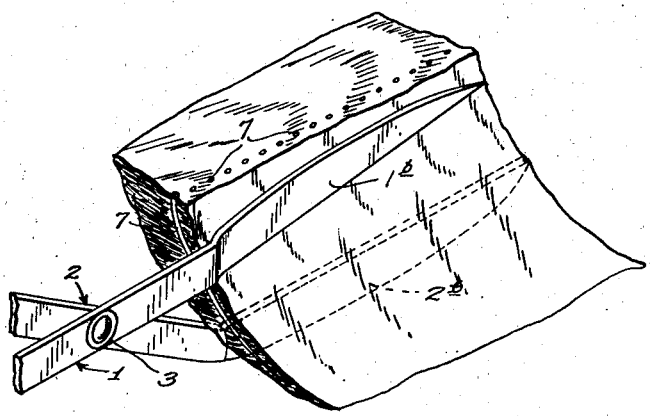
Inventor:
Walter A. Gibbs
by his Attorneys
Howson & Howson Patented June 4, 1940

2,203,566

UNITED STATES PATENT OFFICE 2,203,566

METHOD FOR REMOVING BONES FROM FISH

Walter A. Gibbs, Holly Oak, Del.

Application August 11, 1938, Serial No. 224,379

2 Claims. (Cl. 17—45)

This invention relates to a novel method whereby the bones of a fish may be easily removed. More particularly, the invention relates to a novel method for removing the bones from a fish or piece thereof after the same has been cooked.

With the foregoing in mind, the principal object of the invention is to provide a novel method whereby the bones of a cooked fish may be secured together and may be readily removed collectively or as a unit by the individual or person desiring to consume the fish.

Preferably, the method is performed by a device such as illustrated in the accompanying drawing, which device is adapted to secure or clamp the bones of a cooked fish so that the individual or person desiring to eat the same may readily and easily separate the bones from the meat, or, conversely, the meat from the bones while the latter are secured as a unit by said device. The method is capable of being practiced, however, in various ways, the invention comprising broadly the principle of removing the bones of a fish by securing them together.

In general, the rib bones of a fish lie close to the surface of its body cavity and, therefore, when the fish has been cleaned, the position of the rib bones makes it readily possible to employ the method of the invention, for example, by using a device such as that described hereinafter. This device takes the form of a simple scissor-like element, the jaws of which are adapted to cut through the body of the fish longitudinally at opposite sides of the rib bones so that the latter are securely clamped between said jaws as a unit or collectively. The invention may be understood more clearly from the following description, particularly with reference to the accompanying drawing, wherein Figure 1 is a view in perspective of the device preferably employed in the practice of the invention.

Figure 2 is an enlarged view in section through the jaws of the device illustrated in Figure 1 showing the manner in which they grip or clamp the bones; and Figure 3 is illustrative of the practice of the method by the use of the device as applied to one type of fish.

Referring now more particularly to the drawing, the device illustrated in Figure 1 comprises two generally similar members 1 and 2 each including handle or hand-grip portions 1a and 2a and jaw portions 1b and 2b respectively. As shown, the members 1 and 2 are pivotally connected together as indicated at 3 intermediate their respective hand-grip and jaw portions in such manner that the jaw portion 1b of the member 1 constitutes the upper jaw of the device and the jaw portion 2b of member 2 the lower jaw thereof while the portions 1a and 2a of said members constitute respectively the lower and upper hand-grip portions of the device, the arrangement being such that bringing together of said hand-grip portions operates to bring the jaws of the device together into cooperative association.

An important feature of the device resides in the construction and arrangement of the cooperating edges of the jaw portions 1b and 2b thereof and as shown in Figure 2, the edge of the lower jaw portion 2b is provided with a longitudinally extending groove 4 therein while the lower edge of the upper jaw portion 1b tapers to a relatively thin edge 5 which is adapted to seat in and engage the groove 4 of the lower jaw portion 2b.

The opposite sides of the groove 4 may be notched at intervals therealong as indicated at 6, and it is preferable that the said groove 4 be wider at the top thereof than the edge 5 of the upper jaw 1b so that fish bones of different size may be sprung down into the groove and effectively secured between said jaws 1b and 2b in the manner shown in Figure 2 without danger of them being severed, as would be likely to occur were the edge 5 and groove 4 of the jaws so arranged that they exerted a sheating action thereon. On the other hand, while the edge 5 of the upper jaw portion 1b is described as thin, it is pointed out that said edge is not so sharp or keen that it would readily cut through the bones but it is preferably sufficiently thin so that it will readily cut through the softer, cooked flesh of the fish.

The manner in which the device is used may be clearly understood from the illustration of Figure 3, which shows a section of a fish and the manner and relation in which it is engaged by said device. The rib bones are clearly indicated at 7 and the fish or section thereof is seized or engaged by the jaws 1b and 2b which when pressure is exerted upon the hand-grip portions 1a and 2a of the device, causes said jaws to cut or otherwise pass through the flesh and engage or clamp the ribs 7 securely therebetween in the manner more clearly shown in Figure 2. With the ribs 7 thus secured as a unit or collectively they may be held in the device while the flesh or meat of the cooked fish is removed or otherwise separated from the bones thus secured.

The device above described is illustrative of the practice of the contemplated method by means of a device which is adapted to secure the bones of a cooked fish or section thereof together. The invention may, however, be practiced in any suitable manner or by any suitable means which results in the bones of the cooked fish being secured together so that they may be removed collectively or as a unit by the person desiring to eat or consume the same, and it is to be understood that said invention is not limited to the particular disclosure herein set forth, but that modifications, changes, etc., may be made therein within the scope of the annexed claims.

I claim:

1. The method of removing bones from fish after cooking the same which consists in cutting inwardly through the fish thereof simultaneously from opposite sides of the bones therein, securing said bones together collectively as a unit, and thereafter removing the fish from the bones while the latter are secured together.

2. The method of removing bones from fish after cooking the same which consists in cutting inwardly through the flesh thereof simultaneously from opposite sides of the bones therein and transversely thereof, securing said bones together collectively as a unit, and thereafter removing the flesh from the bones while the latter are secured together.

WALTER A. GIBBS.